US012187296B2

(12) United States Patent
Loghin

(10) Patent No.: US 12,187,296 B2
(45) Date of Patent: Jan. 7, 2025

(54) SYSTEM, METHOD AND COMPUTER PROGRAM TO SUPPRESS VIBRATIONS IN A VEHICLE

(71) Applicant: Sony Group Corporation, Tokyo (JP)

(72) Inventor: Nabil Loghin, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 365 days.

(21) Appl. No.: 17/695,853

(22) Filed: Mar. 16, 2022

(65) Prior Publication Data
US 2022/0306130 A1 Sep. 29, 2022

(30) Foreign Application Priority Data

Mar. 23, 2021 (EP) .................................... 21164429

(51) Int. Cl.
*B60W 50/00* (2006.01)
*B60W 40/06* (2012.01)
(Continued)

(52) U.S. Cl.
CPC ........ *B60W 50/0098* (2013.01); *B60W 40/06* (2013.01); *B60W 40/13* (2013.01);
(Continued)

(58) Field of Classification Search
CPC .. B60W 50/0098; B60W 40/06; B60W 40/13; B60W 2552/20; B60W 2552/35;
(Continued)

(56) References Cited

U.S. PATENT DOCUMENTS 6,032,552 A * 3/2000 Alleai ..................... F16F 15/02
248/562
2002/0055839 A1* 5/2002 Jinnai ..................... G10L 15/10
704/240
(Continued)

FOREIGN PATENT DOCUMENTS

CN 115419556 A * 12/2022 ............ B60W 40/06
CN 115801145 A * 3/2023 ............ B60W 40/06
(Continued)

OTHER PUBLICATIONS

Deigmoeller et al., "Road Surface Scanning using Stereo Cameras for Motorcycles", In Proceedings of the 13th International Joint Conference on Computer Vision, Imaging and Computer Graphics Theory and Applications (VISIGRAPP 2018)—vol. 5, 2018, pp. 549-554.

*Primary Examiner* — Richard A Goldman
(74) *Attorney, Agent, or Firm* — XSENSUS LLP

(57) ABSTRACT

An electronic system for controlling vibrations and/or inertial forces occurring at a plurality of areas of interest within an operating vehicle, the electronic device comprising circuitry configured to: receive input data comprising sensor data from one or more environment sensors (12) and/or one or more internal sensors (14); convert, by means of a machine learning system (18), the input data into actuator settings; and transmit the actuator settings to one or more actuators (20) to control vibrations and/or inertial forces occurring at each of the plurality of areas of interest within the vehicle.

20 Claims, 11 Drawing Sheets

(51) Int. Cl.
  *B60W 40/13* (2012.01)
  *G06N 3/08* (2023.01)
  *H04W 4/44* (2018.01)
(52) U.S. Cl.
  CPC ............... *G06N 3/08* (2013.01); *H04W 4/44* (2018.02); *B60W 2050/0083* (2013.01); *B60W 2420/10* (2013.01); *B60W 2420/403* (2013.01); *B60W 2420/408* (2024.01); *B60W 2420/54* (2013.01); *B60W 2552/20* (2020.02); *B60W 2552/35* (2020.02); *B60W 2556/35* (2020.02); *B60W 2556/40* (2020.02); *B60W 2556/65* (2020.02)
(58) Field of Classification Search
  CPC ......... B60W 2556/40; B60W 2556/65; B60W 2556/35; B60W 2420/408; B60W 2050/0083; B60W 2420/10; B60W 2420/403; B60W 2420/54; H04W 4/44; G06N 3/08
  USPC .......................................................... 701/36
  See application file for complete search history.

(56) References Cited

U.S. PATENT DOCUMENTS

| | | | | |
|---|---|---|---|---|
| 2006/0106500 A1* | 5/2006 | Allaei | ................... | G05D 19/02 700/280 |
| 2012/0320720 A1* | 12/2012 | Hansen | ................. | G11B 7/095 |
| 2013/0259249 A1* | 10/2013 | Sakamoto | ........ | G10K 11/17883 381/71.4 |
| 2015/0224845 A1* | 8/2015 | Anderson | ................ | F03G 7/08 701/37 |
| 2018/0111810 A1* | 4/2018 | Magens | .............. | B66F 9/07559 |
| 2019/0205745 A1* | 7/2019 | Sridharan | ............ | G06F 9/5061 |
| 2020/0159251 A1* | 5/2020 | Iwasaki | ................ | B60R 16/037 |
| 2020/0262477 A1* | 8/2020 | Hirao | ................... | B60G 17/015 |
| 2021/0261393 A1* | 8/2021 | Imaoka | ............... | B66F 9/07559 |
| 2021/0402841 A1* | 12/2021 | Furuta | ............... | B60G 17/0165 |
| 2022/0306130 A1* | 9/2022 | Loghin | .................... | G06N 3/08 |
| 2023/0273019 A1* | 8/2023 | Onimaru | ................ | G08G 1/00 340/905 |
| 2023/0282194 A1* | 9/2023 | Kim | ................. | G10K 11/17854 |

FOREIGN PATENT DOCUMENTS

| | | | | |
|---|---|---|---|---|
| CN | 116699270 A | * | 9/2023 | ............ B60W 40/06 |
| EP | 4063994 A1 | * | 9/2022 | ............ B60W 40/06 |
| WO | WO-2023041763 A1 | * | 3/2023 | ............ B60W 40/06 |

* cited by examiner

| variation of road surface elevation | 6 mm |
|---|---|
| temperature | 84 F° |
| speed | 50 mph |
| wind | 28 mph |
| passenger weight S1 | 165 lbs |
| passenger weight S2 | 150 lbs |

FIG. 2a

| variation of road surface elevation | 12 mm |
|---|---|
| temperature | 82 F° |
| speed | 54 mph |
| wind | 42 mph |
| passenger weight S1 | 165 lbs |
| passenger weight S2 | 150 lbs |

FIG. 2b

| variation of road surface elevation | 8 mm |
|---|---|
| temperature | 78 F° |
| speed | 60 mph |
| wind | 35 mph |
| passenger weight S1 | 175 lbs |
| passenger weight S2 | 155lbs |

FIG. 2c

| actuator setting S1 | 2,600 m/s²; 0,5 mm/s; 0,5 mm; 0,7 kHz/0,2π |
|---|---|
| actuator setting S2 | 2,800 m/s²; 0,5 mm/s; 0,9 mm; 1 kHz/0,5π |

FIG. 3a

| actuator setting S1 | 2,600 m/s²; 0,5 mm/s; 0,5 mm; 0,7 kHz/0,7π |
|---|---|
| actuator setting S2 | 2,200 m/s²; 0,5 mm/s; 1 mm; 0,9 kHz/1π |

FIG. 3b

| actuator setting S1 | 2,100 m/s²; 0,8 mm/s; 0,5 mm/0,9 kHz/1,2π; 0,3 mm/1,8 kHz/1,4π; 0,1 mm/ 2,7 kHz/-0,3π |
|---|---|
| actuator setting S2 | 2,200 m/s²; 0,5 mm/s; 1,2 mm/0,7 kHz/1,5π; 1,0 mm/1,4 kHz/1,2π; 0,8 mm/2,1 kHz/-0,5π |

FIG. 3c

SYSTEM, METHOD AND COMPUTER PROGRAM TO SUPPRESS VIBRATIONS IN A VEHICLE

CROSS-REFERENCE TO RELATED APPLICATION

The present application claims priority to European Patent Application No. 21164429.9, filed Mar. 23, 2021, the entire contents of which are incorporated herein by reference.

TECHNICAL FIELD

The present disclosure generally pertains to the field of vibration suppression, in particular to devices, methods and computer programs for suppressing vibrations in a vehicle.

TECHNICAL BACKGROUND

Vibrations during driving of a vehicle create discomfort and fatigue. It also limits vehicle durability, due to mechanical friction. Internal factors for vibrations are noise, vibrations and harshness (called NVH), created mostly by the engine. These vibrations are less severe for electric engines. External factors include tire friction, uneven roads, road bumps and other obstacles. Even one-time force effects, e.g., when driving over a pothole in the road, will create harmonical vibrations of the car, where vibration frequencies depend on the materials and the measured locations.

Conventional solutions to mitigate mechanical vibrations focus on improved materials (stiffness, harshness) and their construction methods. For example, dampers (absorbers) may be used to absorb such energy. Most methods are static, and do not adapt to the current situation.

A road-scanning system based on stereo cameras for predictive suspension adaptation is known from Deigmoeller, J., Einecke, N., Fuchs, O. and Janssen, H. Road Surface Scanning using Stereo Cameras for Motorcycles. DOI: 10.5220/0006614805490554 In Proceedings of the 13th International Joint Conference on Computer Vision, Imaging and Computer Graphics Theory and Applications (VISIGRAPP 2018)—Volume 5: VISAPP, pages 549-554 ISBN: 978-989-758-290-5.

Another solution consists in measuring acoustics using microphones to predict vibrations and in generating anti-cyclic vibrations to be output via actuators to cancel out or counteract the effects of the vibrations. This necessitates filtering each frequency separately, generating the same frequency and amplitude at 180° out of phase and then adding it to the original frequency.

However, the existing approaches do not exploit the full potential of modern sensory systems of vehicles, which are installed anyway in vehicles. Furthermore, most of the existing approaches only consider vibrations based on measurements, once they occur (e.g., via microphones) and are focused on a general vibration correction in the vehicle.

Although there exist techniques for vibration suppression, it is generally desirable to improve devices and methods for vibration suppression.

SUMMARY

According to a first aspect, the disclosure provides an electronic system for controlling vibrations and/or inertial forces occurring at a plurality of areas of interest within an operating vehicle, the electronic device comprising circuitry configured to: receive input data comprising sensor data from one or more environment sensors and/or one or more internal sensors; convert, by means of a machine learning system, the input data into actuator settings; transmit the actuator settings to one or more actuators to control vibrations and/or inertial forces occurring at each of the plurality of areas of interest within the vehicle.

According to a second aspect, the disclosure provides a computer-implemented method for controlling vibrations and/or inertial forces occurring at a plurality of areas of interest within an operating vehicle, the method comprising: receiving input data comprising sensor data from one or more environment sensors and/or one or more internal sensors; converting, by means of a machine learning system, the input data into actuator settings; transmitting the actuator settings to one or more actuators to control vibrations and/or inertial forces occurring at each of the plurality of areas of interest within the vehicle.

Further aspects are set forth in the dependent claims, the following description and the drawings.

BRIEF DESCRIPTION OF THE DRAWINGS

Embodiments are explained by way of example with respect to the accompanying drawings, in which:

FIGS. 2a, b and c show examples of input data provided to a neural network according to the embodiment represented in FIG. 1;

FIGS. 3a, b and c show examples of output date provided from the neural network according to the embodiment represented in FIG. 1;

DETAILED DESCRIPTION OF EMBODIMENTS

Figure 1:
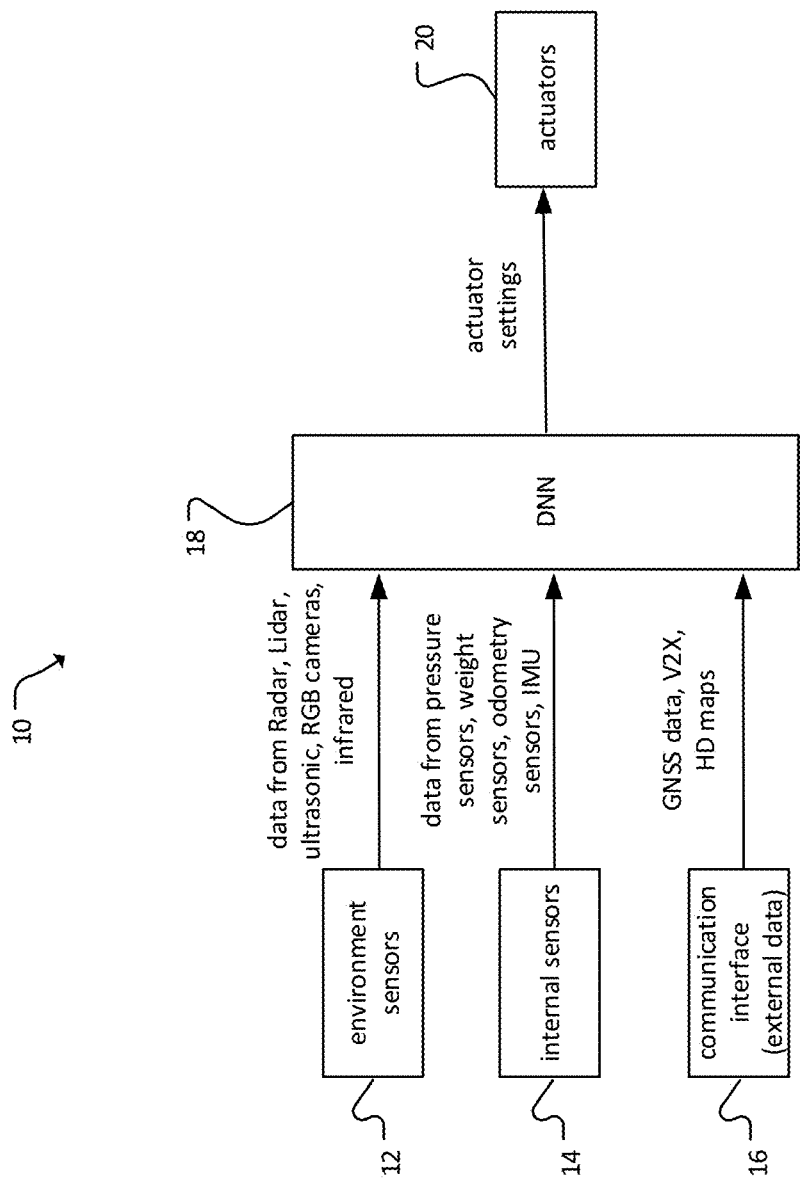
FIG. 1 is a diagram illustrating a vibration cancellation system according to an embodiment of the present invention.

Before a detailed description of the embodiments under reference of FIG. 1 to FIG. 11, general explanations are made.

The embodiments disclose an electronic system for controlling vibrations and/or inertial forces occurring at a plurality of areas of interest within an operating vehicle comprising circuitry configured to receive input data comprising sensor data from one or more environment sensors and/or one or more internal sensors; convert, by means of a machine learning system, the input data into actuator settings; transmit the actuator settings to one or more actuators to control vibrations occurring at each of the plurality of areas of interest within the vehicle.

A vehicle may be any kind of land-vehicle that transports people or cargo, e.g. a car, a self-driving car, a truck, a bus, etc.

Circuitry may include a processor (CPU, GPU), a memory (RANM, ROM or the like), a storage, input means (mouse, keyboard, camera, etc.), output means (display (e.g. liquid crystal, (organic) light emitting diode, etc.), loudspeakers, etc., a (wireless) interface, etc., as it is generally known for electronic devices (computers, smartphones, etc.). Moreover, it may include sensors. Still further the circuitry may comprise a machine learning processor, e.g. dedicated hardware for the processing of machine learning techniques such as a neuromorphic hardware architecture, Graphics Processing Unit (GPU), or similar architectures.

The term "machine learning" may refer to any computer algorithm used to extract useful information from training data by e.g. building probabilistic models (referred to as machine learning models) in an automated way. A machine learning model may be generated using at least one of a classification algorithm and reinforcement algorithm (where reinforcement learning is optional). According to the embodiments, the machine learning system may be an artificial neural network (ANN) and preferably a deep neural network (DNN), in particular a recurrent neural network RNN, e.g. a RNN of the type long short-term memory (LSTM). An LSTM is an artificial recurrent neural network (RNN) architecture used in deep learning. Unlike standard feedforward neural networks, the LSTM has feedback connections. It can not only process (blockwise) single data points (such as images), but also (continuously) entire sequences of data (such as audio streams or video).

By controlling (e.g. reducing) vibrations occurring at a plurality of areas of interest within an operating vehicle, passengers of the vehicle should feel as little motion as possible during driving. This improves well-being, reduces fatigue effects during driving, allows passengers to engage in other tasks, e.g., painting, writing, reading (with less nausea effects), eating/drinking.

The system may exploit sensors integrated in modern vehicles, such as LiDAR/RADAR, cameras, ultrasonic, IMUs, odometry, integrates their output for sensor fusion and applies machine learning to predict vibrations. In addition, IMUs may also be used to predict inertia forces in order to mitigate their impact.

The input data may comprise external data received via a communication interface. A communication interface may be configured to receive external data from communication networks and to supply this data to the machine learning system. A communication interface may for example comprise circuitry configured to enable communication via a mobile phone network such as UMTS or LTE.

The circuitry may be configured to convert, by means of the machine learning system, the sensor data into a vibration distribution of vibrations occurring at each of the plurality of areas of interest within the vehicle.

The circuitry may be configured to convert, by means of the machine learning system, the sensor data direction into actuator settings.

The circuitry may be configured to determine actuator settings based on a vibration distribution.

The plurality of areas of interest are located at least one of: a seat, a backrest, a headrest, a footrest or the dashboard of the vehicle.

The received sensor data may include road condition data of a road in front of the vehicle, obtained by one or more of: an RGB camera, an infrared camera, a RADAR sensor, a LiDAR sensor, an ultrasonic sensor and a microphone.

The road condition data may include an impulse response of a strip of the road. The impulse response may be an average of a plurality of impulse responses obtained from other vehicles by means of car-to-infrastructure communication (C2I) or car-to-car communication (C2C).

The external data may comprise map data.

The received sensor data may comprise odometry data and/or a weight distribution within the vehicle, which can prioritize the different areas of interest, e.g., by placing more emphasize on the driver seat.

The circuitry may be further configured to perform sensor fusion on the sensor data.

The machine learning system may be trained by reinforcement learning. The machine learning may for example be performed using one or more learning algorithms such as linear regression, K-means, classification algorithm, reinforcement algorithm etc. The machine learning system may be trained by a method selected from the group consisting of: supervised learning, semi-supervised learning, unsupervised learning, reinforcement learning and active learning.

The circuitry may implement a physical model of the actuators that predicts a vibration distribution based on actuator settings. A "model" may for example be an equation or set of rules that makes it possible to predict an unmeasured value from other, known values. Alternatively, this model can be learned as well by machine learning.

The circuitry may further be configured to receive data from vibration sensors and to determine a vibration distribution from the received data. The vibration sensors may for example comprise Micro-Electro-Mechanical System (MEMS) based Inertial Measurement Units (IMUs) or microphones that detect tiny vibrations.

An actuator may be any device that is configured to control a mechanism or system, for example by moving a part/component of the system or by controlling a characteristic of the system.

For example, the actuators may be any actuators configured to convert a signal (e.g. electric, electrical, magnetic, electromagnetic, or the like) into a physical vibration output that has a frequency, an amplitude, and a phase. For example, the actuators may be in the form of a piezoelectric element. Alternatively, the vibration generator may be in the form of a motor-driven vibration generator (offset-mass motor, conventional engines/motors). Still further alternative embodiments are possible.

The actuators may be realized by applying moving seats (or elements thereof, such as the back rest or even smaller sections as the upper left area of the back rest), or larger parts of a vehicle, or a chassis of the vehicle. For example, a seat itself may quickly move on a small scale to mitigate inertia forces.

Vibrations and/or inertia forces may also be controlled by adjusting characteristic of equipment of the vehicle, for example the stiffness of the material of equipment of the vehicle. Equipment of the vehicle may for example be a seat rest or seat belt.

The embodiments also disclose a computer-implemented method for controlling vibrations and/or inertial forces occurring at a plurality of areas of interest within an operating vehicle, the electronic device comprising circuitry, the method comprising: receiving input data comprising sensor data from one or more environment sensors and/or one or more internal sensors; converting, by means of a machine learning system, the input data into actuator settings; and transmitting the actuator settings to one or more actuators to control vibrations and/or inertial forces occurring at each of the plurality of areas of interest within the vehicle.

According to a further aspect, the disclosure provides a computer program comprising instructions, the instructions when executed on a processor causing the processor to perform the computer-implemented method described here.

Embodiments are now described by reference to the drawings.

Predicting Actuator Settings with a Machine Learning System

The mechanics of a complex system as a car, are not purely linear. Non-linear behavior, such as hysteresis effects of metals or compound materials, temperature, humidity and pressure-dependent characteristics and so on need to be taken into account. In real-world, the behavior will depend on many parameters, which cannot all be directly measured, such as weight distribution within the car, tire parameters, and the like. Since such amount of sensory information, measuring such parameters directly or indirectly, leads to infeasible solutions using classical mechanics and precise modelling becomes very complex, even for limited number of sensors, a general idea of the invention is to apply machine learning (ML).

Most of the vibrations within a car are of low frequency and may be corrected with by such a cancellation device. However, any correction on one location (e.g. on driver seat) will create additional vibration patterns in other regions, thereby creating a chaotic/highly non-linear system. Thus, machine learning operating on the complete vibration distribution within the car, as described in the embodiments below in more detail, may be able to cope with these effects.

FIG. 1 is a diagram illustrating a vibration cancellation system according to an embodiment of the present invention.

The vibration cancellation system as shown in FIG. 1 is configured to counteract vibrations occurring at each of a plurality of areas of interest within an operating vehicle. The vibration cancellation system comprises environment sensors 12 which are configured to capture sensor data from the environment of the vehicle, internal sensors 14 which are configured to capture sensor data from within the vehicle, and a communication interface 16 configured to receive data from communication networks. The vibration cancellation system further comprises a DNN 18 as a machine learning system, and actuators 20 configured to generate vibrations to counteract vibrations occurring at each of a plurality of areas of interest within an operating vehicle. DNN 18 is trained to directly determine appropriate actuator settings to be output to each of the actuators 20, distributed at various areas of interest (vibration cancellation areas), when the vehicle is subjected to a predetermined set of conditions as defined by the data from the environment sensors 12, the data from the internal sensors 14 and the data received via communication interface 16. That is, DNN 18 has been trained (prior to being deployed and/or training is performed/refined during operation) to associate a set of conditions as defined by collected environment sensor data, operational data of the vehicle and external data (map information, location information etc.) with actuator settings for each of the plurality of actuators 20 to be controlled. The predetermined set of conditions may include road conditions, operating conditions, weather conditions, a given weight distribution on seats, and the like. After training, the sensor data captured by the environment sensors 12, the sensor data captured by the internal sensors 14 and the data acquired by the communication interface 16 are provided to DNN 18 that is trained to convert the data into actuator settings to control the actuators 20.

The vibration cancellation system may include a single actuator 20 or a plurality of actuators 20 distributed at predetermined areas of interest inside the vehicle, for example, under each passenger seat, in each backrest, headrest, footrest or in the dashboard. Also, in some embodiments, a single component may operate as both a sensor (internal sensor 14) and an actuator. In the embodiment of FIG. 1, the output signals of the trained DNN 18 are the actuator settings to control these actuators 20. The final objective for which DNN 18 is trained is to control the actuators 20 provided at the predetermined areas of interest within the vehicle so as to optimally control (reduce or cancel out) the vibrations occurring at each of the predetermined areas of interest. In this manner, vibrations may be corrected, for example, individually for each passenger. For example, the vibration cancellation system 10 may cancel inertia effects such as acceleration (body being pressed into the seat), deceleration/braking (body being pushed forward, protected only by seat belt), and centrifugal forces (when driving a curve). The actuators 20 can also be realized by applying moving seats, or even moving larger parts of the car like the chassis itself. The latter is known from tilting trains, where the train is tilting/rolling its angle towards the bending of the curve. If the DNN 18 predicts the actuator settings for these components as described in FIG. 1, centrifugal forces can be nullified. As for acceleration/deceleration, other methods may be applied such as gently adjusting the stiffness of the material, such as seat rest or seat belt. Also, the seat itself may quickly move on a small scale to mitigate inertia forces.

Figure 8:
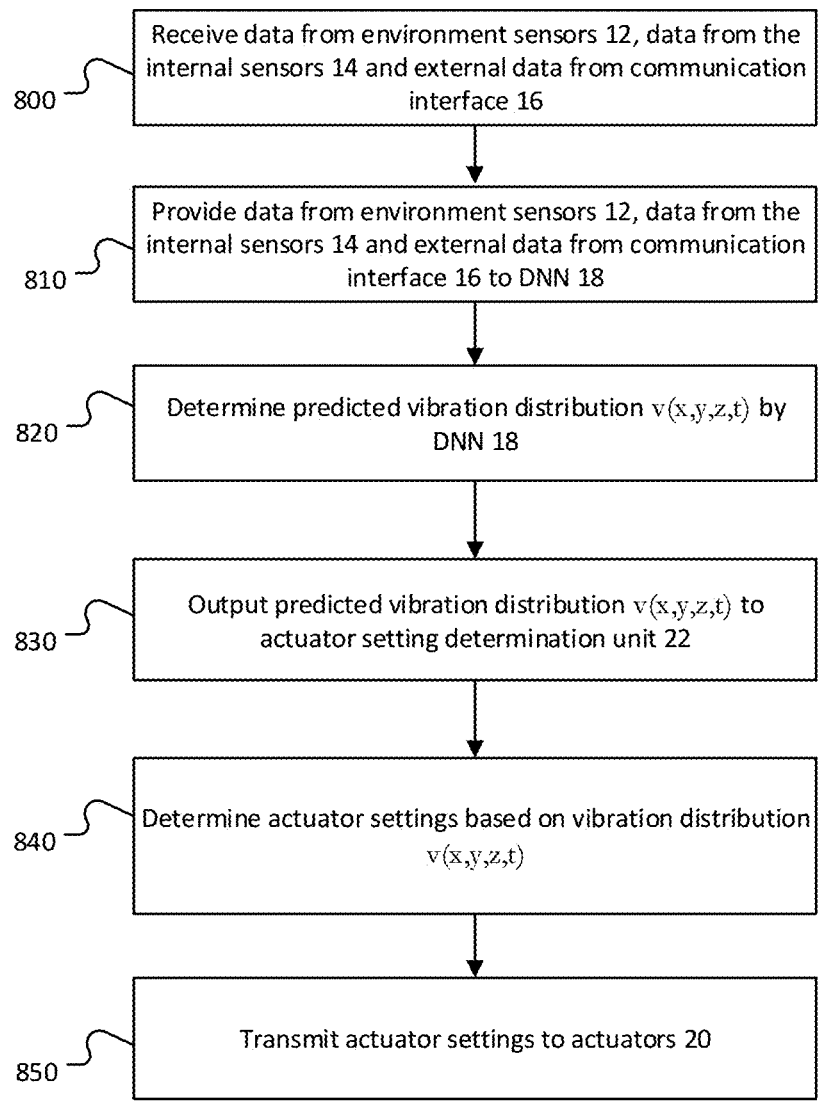
FIG. 8 shows a flow diagram of a process for vibration cancellation using machine learning as performed by the vibration cancellation system represented in FIG. 7.

As illustrated in FIG. 1, a trained DNN 18 receives the sensor data detected from the environment sensors 12, the sensor data detected from the internal sensors 14 and the external data 16, and determines, based on these data, a plurality of output signals to control vibrations occurring in the vehicle, as described in more detail with respect to FIGS. 2 and 8.

Figure 11:
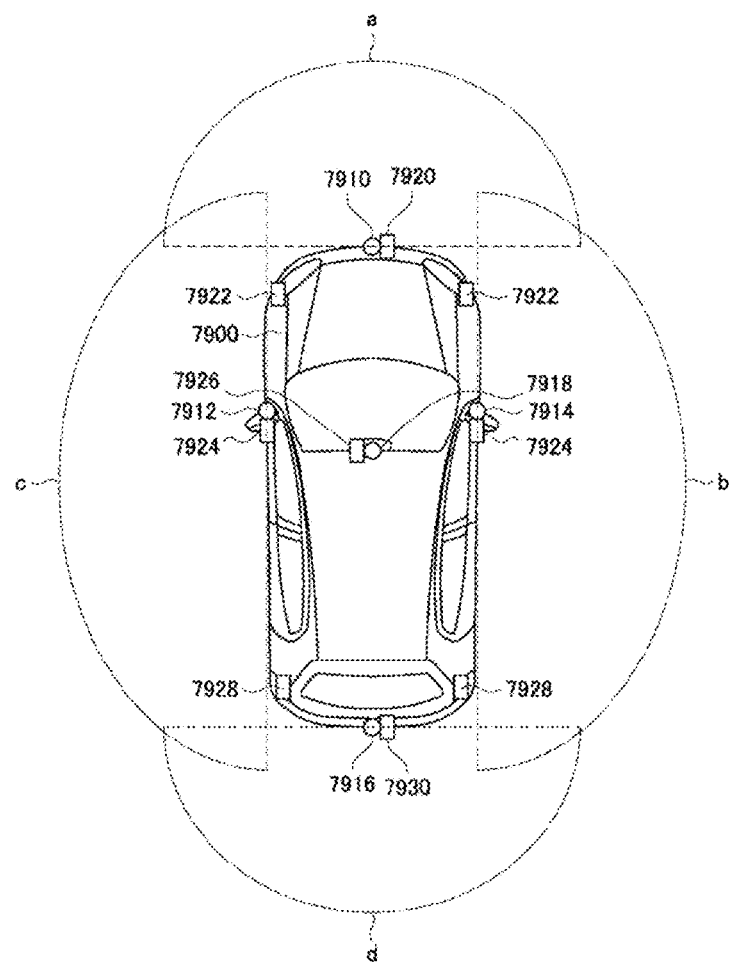
FIG. 11 shows an example of installation positions of environment sensors.

The environment sensors 12 (see also imaging section 7410 and outside-vehicle information detecting section 7420 in FIG. 11) are configured to perceive the external world and provide sensor data that describes an environment in the vicinity of the vehicle. The sensors 12 may include cameras (RGB, infrared), RADAR sensors, LiDAR (light detection and ranging) sensors, ultrasonic sensors, microphones and the like. Further, the environment sensors 12 may include a thermometer, an anemometer or the like. The cameras may be located at an appropriate position inside the vehicle or outside the vehicle in order to acquire images of the road in front of the vehicle (see FIG. 11 and corresponding description). For example, the cameras may be located near the rear-view mirror facing forward. The cameras may be a mono camera, a stereo camera, an Around View Monitoring (AVM) camera, or a 360-degree camera. The cameras may utilize various image processing algorithms to acquire, for example, location information of a detected object, information on the distance to the object, and information on the speed relative to the object. For example, the cameras may acquire the information on the distance to the object and the information on the speed relative to the object based on a change in size of the object over time in acquired images or based on information on disparity between stereo images acquired by a stereo camera. The RADAR and camera may continuously detect the upcoming road conditions (road quality, road profile, irregularities of the road) in front of the vehicle. For example, obstacles such as road bumps, but also tiny variations of the road quality can be predicted. The environment sensors 12 measure the surrounding of a vehicle in real time and continuously communicate the acquired information to DNN 18 to adapt vibration control accordingly.

The internal sensors 14 (see also vehicle state detecting section 7110 and in-vehicle information detecting unit 7500 in FIG. 11) are configured to measure various operational data of the vehicle. Sensory information which allows the DNN 18 to predict vibrations is for example odometry data such as wheel position, brake/accelerator pedal position, current speed, IMU, etc. To this end, the internal sensors 14 may include a wheel sensor configured to detect a wheel position, an accelerator pedal position sensor configured to detect an engagement amount of the accelerator pedal, a brake pedal position sensor configured to detect an engagement amount of the brake pedal, a speed sensor configured to detect a current speed, an Inertial Measurement Unit (IMU) configured to detect vehicle motion data (linear acceleration, angular rate), a weight sensor mounted on a seat configured to detect a weight of a seat occupant, a tire pressure sensor configured to detect a tire pressure, and the like. The internal sensors 14 measure the operational data of the vehicle and continuously communicate information regarding the operational data of the vehicle to DNN 18 to process and adapt vibration control accordingly.

The internal sensors 14 may also include a global positioning system unit (GPS) (see also positioning section 7640 in FIG. 11). It should be noted that in the context of the present invention GPS is representative of all Global Navigation Satellite Systems (GNSS), such as GPS, A-GPS, Galileo, GLONASS (Russia), Compass (China), IRNSS (India) and the like. Together with data from the environment sensors 12 (camera/RADAR and other sensors), such data from the internal sensors 14 may allow DNN 18 to predict the upcoming course of action. E.g. driving towards a sharp corner with rather high speed, where the information of the corner can be extracted from HD maps or from the camera, the system can prepare to initialize countermeasures to cancel vibrations/inertia forces. Similarly, due to a potential accident ahead, the driver needs to decelerate even stronger, which may be predicted by the DNN.

Communication interface 16 (see also general-purpose communication I/F 7620 and dedicated communication I/F 7630 in FIG. 11) is configured to receive external data from one or more communication network and to supply this data to DNN 18. Communication interface 16 may for example comprise circuitry configured to enable communication via a mobile phone network such as UMTS or LTE. The communication interface can enable communication with a cloud service, for example.

Communication interface 16 may for example comprise interface circuitry configured for an exchange of road-related data with another vehicle (C2C) or with an installed infrastructure (C2I) as part of wireless vehicle-to-environment communication. Car-to-environment communication (C2X or V2X communication) refers to wireless communication that can take place as car-to-infrastructure communication (C2I) or car-to-car communication (C2C). The C2C- and C2I-communication may, for example, be carried out via a cellular mobile network, such as e.g., a LTE or 5G communication network. C2I- or C2C-communication may be exploited to signal to the vehicle in advance upcoming driving conditions relating to a particular route section. For example, a traffic light may store road conditions, in particular observed impulse responses (see below) from other vehicles, may average them over a sliding time window, then signal the averaged impulse response to the next vehicle, such that it can adjust its vibration cancellation parameters.

Communication interface 16 may further be configured to receive HD maps from a navigation service. Digital maps received via communication interface 16 may also be used within a navigation system installed in the vehicle. A digital map may for example contain information relating to a section of the route and may make said information available to DNN 18 when the vehicle is traveling on that section of the route. High-definition maps (HD maps) may be used to identify features of a road section including lane placement, road boundaries, the severity of curves, the gradient of the road surface, the road surface properties such as roughness, grip or friction, and the like. HD maps may consider this to provide accurate information. HD-maps have a high precision at resolutions that may be down to several centimeters. Such properties of road sections may change, for example, at different times of a day. Therefore, HD maps may be dynamic and may be updated via communication interface 16 or may be newly generated in a form of crowd-sourced data based on sensor data from vehicles traveling along road sections of a road network. Accordingly, communication interface 16 may be configured to upload the quality of the street to the cloud, e.g., a road site accident, which can warn other cars in advance or to send the information directly to nearby cars in C2C mode.

For self-driving cars (fully autonomous or only limited), additional cancellation methods may be used: the autonomous system itself knows with some time in advance its course of action. Thus, anti-vibration/anti-inertia force methods may be calculated within the overall system, i.e. optimizing both the driving condition for the car itself (as is done for autonomous driving) as well as for the internal vibration distribution.

In the embodiment of FIG. 1, the system is configured to receive input data comprising sensor data from one or more environment sensors and one or more internal sensors. However, in alternative embodiments, the system might comprise only one or more environment sensors but no internal sensors, and in still other alternative embodiments, the system might comprise only one or more internal sensors but no environment sensors.

Examples of Sensor Data Input to DNN

FIGS. 2a, b and c show examples of input data provided to DNN 18 according to the embodiment represented in FIG. 1.

Referring to FIGS. 2a, b and c, sensor data obtained from the environment sensors and sensor data obtained from the internal sensors during operation of a vehicle may be provided to the trained DNN as a set of sensor data. In a simplified example, the sensor data may, for example, include a measured variation in road surface elevation, a temperature, a vehicle speed, a wind speed and a passenger weight at each seat. However, it is obvious for a skilled person that the invention is not limited to the mentioned sensor data and that various other sensor data might be collected and provided to the trained DNN. In addition, external data such as HD maps and road related data from other vehicles may be fed to the DNN.

FIG. 2a shows a first example of a set of sensor data provided to the trained DNN. A variation of the road surface of 6 mm, a temperature of 84° F. and a wind speed of 28 mph are captured by appropriate environment sensors (12 in FIG. 1) and provided to the trained DNN. Further, a vehicle speed of 50 mph, a weight of a first passenger occupying a first seat S1 of 165 lbs and a weight of a second passenger occupying a second seat S2 of 150 lbs are captured by appropriate internal sensors (14 in FIG. 1) and provided to the trained DNN. In the example above, the variation of the road surface of 6 mm is given as a simplified example. In practice, the DNN may take into account more complex information such as information about where the variation occurs: e.g. one vertical step onto a higher level, which affects all wheels, or one horizontal bar, affecting again all wheels, but first raising the front wheels upwards, then down again, next the rear wheels, or a small obstacle, like a concrete brick/stone, which may only affect one or two wheels.

FIG. 2b shows a second example of a set of sensor data provided to the trained DNN. A variation of the road surface of 12 mm, a temperature of 82° F. and a wind speed of 54 mph are captured by appropriate environment sensors (12 in FIG. 1) and provided to the trained DNN. Further, a vehicle speed of 54 mph, a weight of a first passenger occupying a first seat S1 of 165 lbs and a weight of a second passenger occupying a second seat S2 of 150 lbs are captured by appropriate internal sensors (14 in FIG. 1) and provided to the trained DNN.

FIG. 2C shows a third example of a set of sensor data provided to the trained DNN. A variation of the road surface of 8 mm, a temperature of 78° F. and a wind speed of 60 mph are captured by appropriate environment sensors (12 in FIG. 1) and provided to the trained DNN. Further, a vehicle speed of 35 mph, a weight of a first passenger occupying a first seat S1 of 175 lbs and a weight of a second passenger occupying a second seat S2 of 155 lbs are captured by appropriate internal sensors (14 in FIG. 1) and provided to the trained DNN.

Impulse Responses (IR)

A vehicle equipped with the vibration cancellation system of FIG. 1 may also be configured to exchange, via a communication interface (16 in FIG. 1), impulse responses (IR) with cloud services (using e.g. V2I technology as describe above) or with other vehicles (using e.g. V2V technology as describe above). For example, an impulse response (IR) of a strip of road, e.g., based on some material as asphalt may be introduced. This is well-known from vibration testing of materials. The IR is a function, which describes, how a Dirac impulse will affect a system. For example, an IR may model, how a wheel will absorb energy, when driving over a particular piece of road. It may be a planar function depending on longitude and latitude, but not on height. The car itself will not measure such impulse function directly but needs to deconvolve its particular input signature (determined by the car itself, as well as other properties, such as weight distribution, speed, . . . ).

Assuming only linear behavior, the resulting vibration distribution may be a convolution of the impulse function and the action of the car. For non-linear systems, Volterra series can describe the behavior in a similar manner. Instead of using time-domain IR, the frequency domain transfer function (Fourier transform of IR) can also be used.

The vehicle using the vibration-cancellation (or at least vibration detection) technology of FIG. 1 may signal those IRs/transfer functions, by uploading to a cloud via wireless communication, such as 5G. The uploaded information could be included by the cloud server as meta-information, e.g. in map systems such as a navigation system (e.g. this information could be integrated into the HD maps as meta-data on the cloud server), or directly by transmission to edge/road side infrastructure (e.g., locally installed servers at an intersection, or the like). Over time, more precise information may be gathered. Also, time/weather dependent behavior may be extracted/predicted, e.g., the street material may change its behavior during night, when the temperature drops compared with day-time behavior, also depending on the level of sunshine, etc. Also, these impulse responses may be used by the DNN as input data to predict vibrations. For example, if the car approaches a location or an area, where IR information is available, the DNN can infer in advance, what its reaction will be (basically, learning from the reaction of previous cars). As in linear systems, the response of the system can be described by the IR, eliminating the particular input (here car properties). IRs as described above are typically used for linear systems, but extensions are also possible for non-linear systems using Volterra series or the like.

Actuator Settings

FIGS. 3a, b and c show examples of output date provided from the neural network according to the embodiment represented in FIG. 1

In the example represented in FIGS. 3a, b and c, the trained neural network determines matches between acquired sets of sensor data, for example the sets of sensor data represented in FIGS. 2a, b and c, and a set of actuator settings for actuators located, for example, at the seat S1 and the seat S2.

In the following it is distinguished between instantaneous (transient) actuator settings (such as acceleration and velocities) and periodic settings (e.g. described by a sinusoidal carrier with specific magnitude and frequency and phase). The instantaneous (transient) actuator settings are foreseen to correct instantaneously predicted displacements (such as driving over a road bump). Such event will, in general, create vibrations within a car, even if their effect at a certain position (e.g. actuator S1 position) is fully neutralized by the actuator. Such vibrations, together with any other vibration from other causes (friction, . . . ) should be cancelled by anti-cyclic periodic actuator motions. Here, magnitude, frequency, and phase should be estimated by the DNN. For anti-cyclic cancellation, the same magnitude is used, and the phase is shifted by 7E.

FIG. 3a shows an output example of a first set of actuator settings, where the settings for a first actuator mounted on the first seat S1 comprise an acceleration of 2,600 m/s$^2$, a velocity of 0.5 mm/s, a displacement (magnitude) of 0.5 mm, a frequency of 0.7 kHz and a phase of $0,2\pi$, and the settings for a second actuator mounted on the second seat S2 comprise an acceleration of 2,800 m/s$^2$, a velocity of 0.5 mm/s, a displacement of 0.9 mm, a frequency of 1 kHz and a phase of $0.5\pi$.

FIG. 3b shows an output example of a second set of actuator settings, where the settings for a first actuator mounted on the first seat S1 comprise an acceleration of 2,600 m/s$^2$, a velocity of 0.5 mm/s, a displacement (magnitude) of 0.5 mm, a frequency of 0.7 kHz and a phase of $0,7\pi$, and the settings for a second actuator mounted on the second seat S2 comprise an acceleration of 2,200 m/s$^2$, a velocity of 0.5 mm/s, a displacement of 1 mm, a frequency of 0.9 kHz and a phase of $1\pi$.

FIG. 3c shows an output example of a third set of actuator settings, where the settings for a first actuator mounted on the first seat S1 comprise an acceleration of 2,100 m/s$^2$, a velocity of 0.8 mm/s, a displacement of 0.5 mm associated to a fundamental frequency of 0.9 kHz and a phase of $1,2\pi$, a displacement (magnitude) of 0.3 mm associated to a fundamental frequency of 1.8 kHz and a phase of $1,4\pi$, and a displacement (magnitude) of 0.1 mm associated to a fundamental frequency of 2.7 kHz and a phase of $-0,3\pi$, and the settings for a second actuator mounted on the second seat S2 comprise an acceleration of 2,200 m/s$^2$, a velocity of 0.5 mm/s, a displacement (magnitude) of 1.2 mm associated to a fundamental frequency of 0.7 kHz and a phase of 1,5π, a displacement (magnitude) of 1.0 mm associated to a fundamental frequency of 1.4 kHz and a phase of 1,2π, and a displacement (magnitude) of 0.8 mm associated to a fundamental frequency of 2.1 kHz and a phase of −0,5π. In the output example of FIG. 3c, two additional higher order harmonics from the fundamental frequency 0.9 kHz, namely 1.8 kHz and 2.7 kHz are used for the first actuator setting and two additional higher order harmonics from the fundamental frequency 0.7 kHz, namely 1.4 kHz and 2.1 kHz are used for the second actuator setting.

The examples of FIGS. 3a, b, and c are given for the purpose of illustration. In practice, the DNN may output not only acceleration, velocity, displacement, and frequency/phase, but may also include a direction (vector): e.g., pushing seat S1 downwards as a first predefined direction and pushing seat S1 upwards as a second predefined direction. In an implementation, each direction (e.g., seat position X moving in direction D) may be controlled by individual actuators, each actuator allowing only motion in one direction (e.g. up or down with respect to the respective direction D_actuator of the respective actuator). Still further, an actuator in this context may physically move all the targeted displacements in a superimposed manner, or, alternatively, an actuator may be seen as an array of actuator sub-elements, each sub-element controlling one particular displacement.

Actuators may be any actuators configured to convert an electrical signal into a physical vibration output that has a frequency, an amplitude, and a phase. The actuators may for example be piezoelectric elements. A piezoelectric element consists of a material, most often of a ceramic type, which on compression or strain in a certain direction, the direction of polarization, generates an electric field in this direction. To operate the piezoelectric element as an actuator, an input, such as an electrical voltage, is applied to the poles of the piezoelectric element that causes the material to compress or elongate so as to generate an output force that is proportional to the applied input. This may be used for an active vibration control (vibration reduction, vibration cancellation) by choosing the polarity of the applied electric voltage in such a way that the mechanical stress of the actuator creates a mechanical vibration which efficiently controls the vibrations occurring on each of the various areas of interest.

In a preferred embodiment, the actuators may be controlled to completely cancel out vibrations to be expected under a predetermined set of driving conditions. In this case, the actuator settings may be settings causing the actuators to generate vibrations with a 180-degree phase shift with respect to predicted vibrations (described below), such that the vibrations are an inverse of the predicted vibrations, so-called anti-phase vibrations. The control of the actuators may be performed, for example, by applying time-varying current (inducing time-varying vibration) inverse in phase to the reference signal so as to reduce vibrations.

Figure 4:
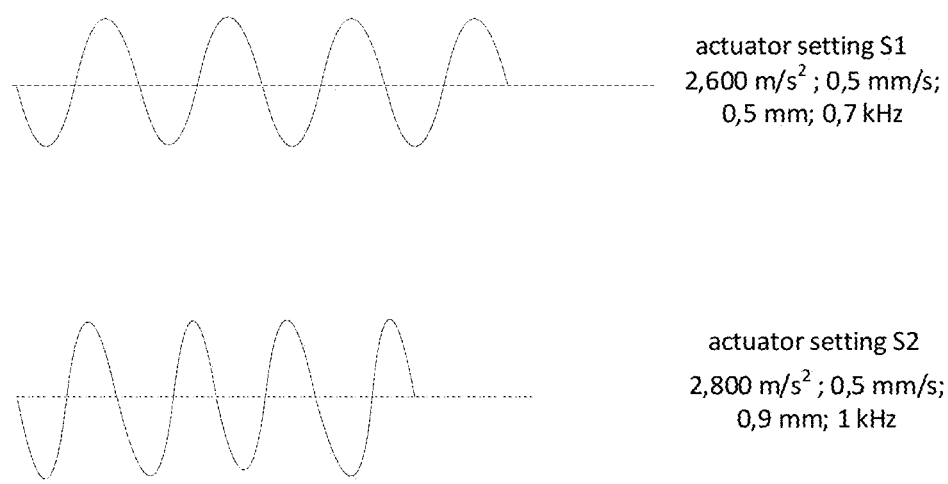
FIG. 4 shows an actuator current which controls an actuator to generate physical output in form of vibrations.

FIG. 4 shows an actuator current which controls an actuator to generate physical output in form of vibrations. According to the embodiment of FIG. 1, actuators (20 in FIG. 1) are configured to output vibrations based on actuator settings determined by the DNN (18 in FIG. 1). For example, the output values of the DNN may be translated into an electric signal as shown in FIG. 4. FIG. 4 shows the case where the actuator settings output by the DNN (18 in FIG. 1) are translated into a current fed to the first actuator mounted on the first seat S1 which, according to the current, generates vibrations defined by an acceleration of 2,600 m/s², a velocity of 0.5 mm/s, a displacement of 0.5 mm and a frequency of 0.7 Hz. The current fed to the second actuator mounted on the second seat S2 causes vibrations defined by an acceleration of 2,800 m/s², a velocity of 0.5 mm/s, a displacement of 0.9 mm and a frequency of 1 Hz.

Depending on the actuator technology (e.g. hydraulically), some time to run actuators 20 on full force may be needed (e.g. creating the hydraulic pressure). Such ramp-up times can be considered and learned within the DNN (20 in FIG. 1).

Figure 5:
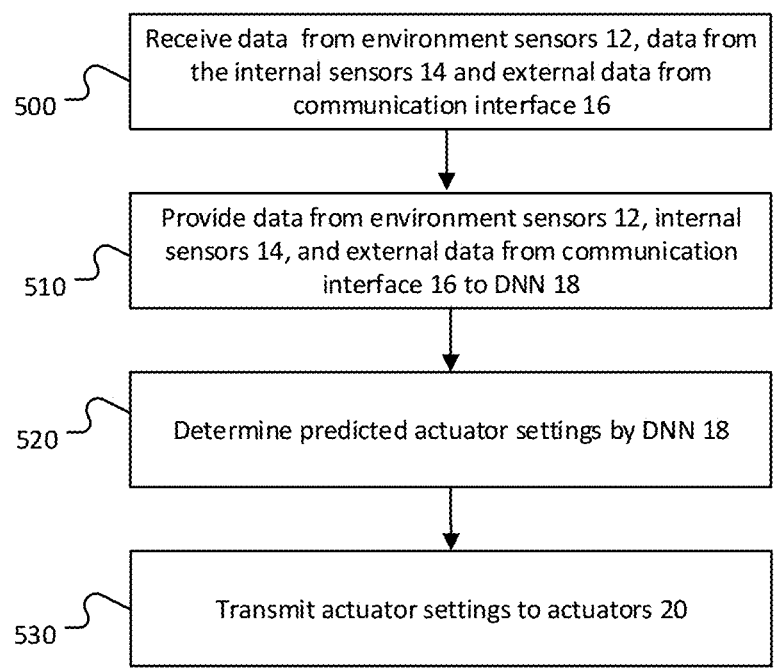
FIG. 5 shows a flow diagram of a process for vibration cancellation using machine learning as performed by the vibration cancellation system represented in FIG. 1.

FIG. 5 shows a flow diagram of a process for vibration cancellation using machine learning as performed by the vibration cancellation system represented in FIG. 1.

The process is executed, for example, by a processing unit (see also microcomputer 7610 in FIG. 11), in particular by a processor or an application-specific integrated circuit of the processing unit (not shown). The processing may include dedicated hardware for the processing of machine learning techniques. The processing takes place when the vehicle that includes a vibration cancellation system as described in FIG. 1 is operational.

At 500, when the vehicle is operational, data from the environment sensors 12, data from the internal sensors 14, and the external data obtained via communication interface 16 is received. At 510, the data received in 500 are fed (block-wise, via a sliding-window over a certain time-frame or continuously) into a deep neural network (DNN) trained to determine, based on the input data, actuator settings to be transmitted to actuators provided for controlling vibrations occurring upon predetermined areas of interest in a vehicle. That is, the collected data such as environment sensor data, operational data, map data and data from service provider are continuously input to trained DNN 18. At 520, the DNN determines, based on the provided input information, predicted actuator settings to be transmitted to actuators provided for controlling vibrations in the vehicle. At 530, the determined actuator settings are transmitted to the actuators 20 to be controlled. The actuators then output, based on the received actuator settings, vibrations, in particular anti-phase vibrations, so as to modify (reduce or cancel out) the vibrations occurring at predetermined areas of interest in the vehicle.

Reinforced Learning

As described with regard to FIG. 1 above, the vibration cancellation system according to the embodiments use a machine learning system to counteract vibrations occurring at each of a plurality of areas of interest within an operating vehicle. The machine learning system is trained to associate a set of conditions as defined by collected environment sensor data, operational data of the vehicle and external data (map information, location information etc.) with actuator settings for each of the plurality of actuators to be controlled.

Figure 6:
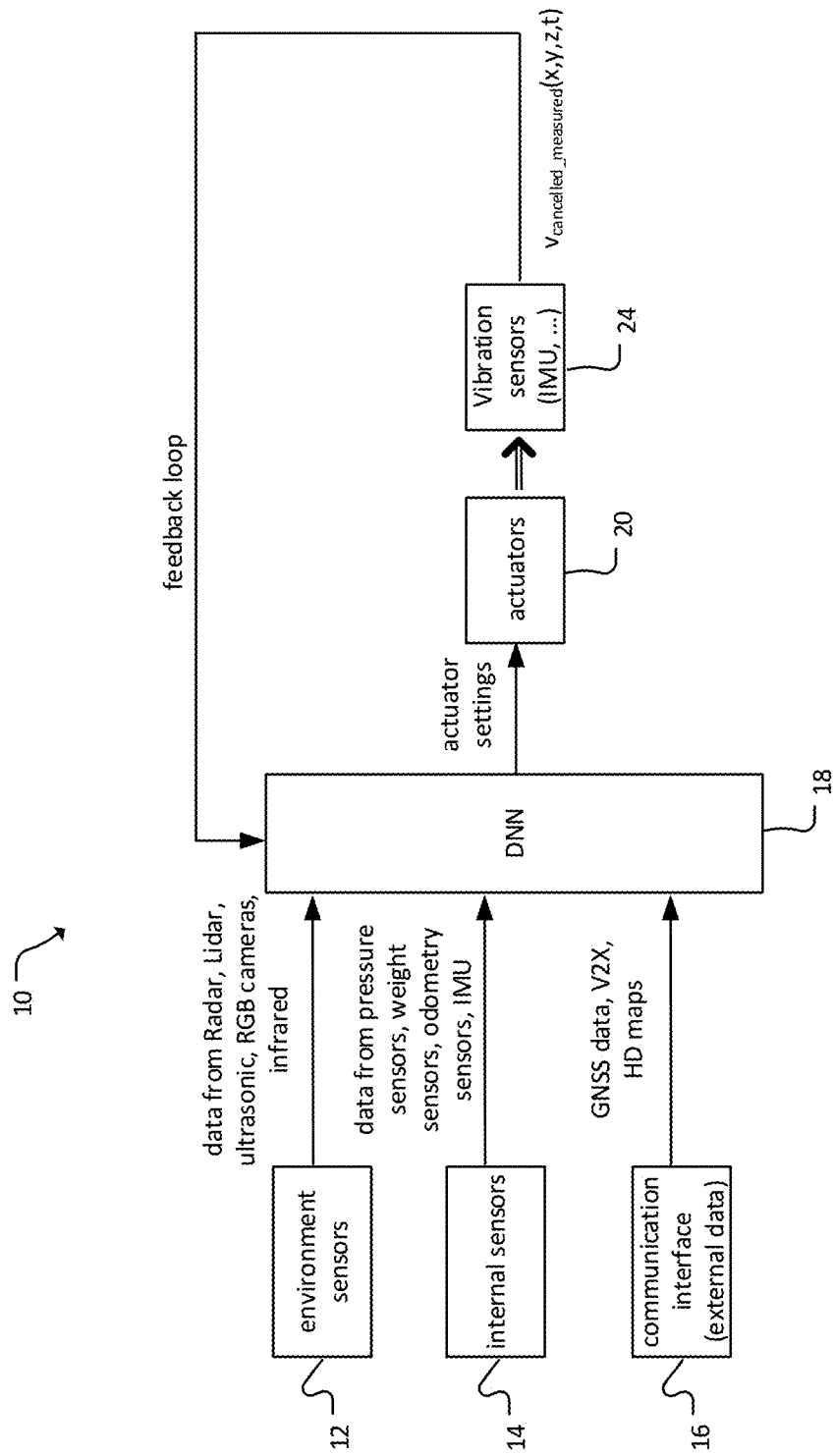
FIG. 6 schematically shows an example of machine learning that is based on "reinforcement learning" as training on-the-fly/refinement technique.

FIG. 6 schematically shows an example of machine learning that is based on "reinforcement learning" as training on-the-fly/refinement technique. As indicated by the arrow, the reaction of the overall system including the vibrations caused by the actuators is fed back to the DNN. In this way, the neural network adapts itself during operation, by observing the reaction of the system (desired output: no vibrations, then the network acts with certain parameters and observes the behavior). The on-the-fly training thus includes a feedback loop, which considers the real reaction of the actuators, based on the DNN recommendation (DNN output). The real (residual) vibration distribution $v_{cancelled\_measured}(x,y,z,t)$ after cancellation (which depends on both location x,y,z and time t) by actuators is measured by vibration sensors 24. The remaining vibrations $v_{cancelled\_measured}(x,y,z,t)$ should be minimized by the feedback loop. To this end, the vibration distribution $v_{cancelled\_measured}(x,y,z,t)$ could be averaged over the areas of interest, or some priority weighting can be used (e.g., minimize driver seat vibrations more important than other areas). The vibration sensors 24 may for example comprise Micro-Electro-Mechanical System (MEMS) based Inertial Measurement Units (IMUs) or microphones that detect tiny vibrations. Also new materials such as graphene elastomer-based flexible sensors may be used to detect microscopic movements.

Reinforcement learning methods can be applied on-the-fly, i.e. during operation of the vehicle. For example, the DNN is trained in advance but will be updated on-the-fly. In such methods, the output of the neural network (e.g., desired output is a vibration-free environment within the car, possibly including prioritizations, e.g., driver seat position with high priority) is fed back to the optimization problem itself, thereby fine-tuning the parameters during operation.

A DNN is usually trained offline in a controlled environment (e.g., test drive) and/or within a software simulation. The sensory equipment in the controlled environment may be more precise than the one, which is used in later deployment on the road. As an example, the car (in the test environment) is crossing some obstacle, and the reactions are measured with high accuracy (i.e., the vibration distribution at the regions of interest). Using sensory input data (e.g. LiDAR, RADAR, camera, or the like of this test situation), the DNN needs to predict the vibration distribution or the actuator settings, which would (in theory) minimize the vibrations. I.e., during training, the ideal (and known) output should be achieved by DNN. When the pre-trained DNN is used later for normal operation outside the controlled environment, the DNN may need further fine-tuning. One reason could be imperfections within the input sensors. Another reason are physical limitations using real actuators, which are further subject to aging, temperature variations and the like. By using a physical model for the actuators, for example, the ideal actuator settings predicted by the DNN may be translated into the limited actuator settings of the deployed actuators. This helps to predict more accurately inertia forces and to mitigate the expected vibrations.

The advantage of outputting actuator settings is that the DNN can be optimized/trained with a simple target function: the target is to minimize the resulting vibration ($v_{cancelled\_measured}(x,y,z,t)$ or $v_{cancelled}(x,y,z,t)$) within the areas of interest.

Training Phase

The proposed machine learning approach may consider a prior training phase of the neural network (or related neuromorphic hardware architecture), e.g., with extensive training data, where the vibration distribution $v_{cancelled\_measured}(x,y,z,t)$ at different locations, e.g. at each passenger seat, within each back rest or head rest, is measured as ground truth.

With respect to this training process, the skilled person may use any known techniques, such as the original training mechanism for LSTMs as described by Gers et al, 2002 in "Learning Precise Timing with LSTM Recurrent Networks" in Journal of Machine Learning Research 3 (2002), 115-143, which is based on a gradient method by means of which the weights of the LSTM units are adjusted. During this training process, the neural network is preferably presented with a large number of examples (training data). In this way, sensor output signals characteristic for a particular set of conditions inside the vehicle (captured by the internal sensors) and outside the vehicle (captured by the environment sensors) are assigned to a corresponding vibration distribution at predetermined areas of interest. These assignments are learned by the neural network and can then be used in the determination process by the neural network. Alternatively, "dilated convolutional neural networks" or "transformers" can be used. In general, any Seq2Seq (sequence to sequence architecture) may be used.

Predicting Vibration Distributions

In the embodiment of FIG. 1, the neural network is trained to directly convert detected environment data, detected operational data and external information into actuator settings to be transmitted to the actuators (20 in FIG. 1).

Figure 7:
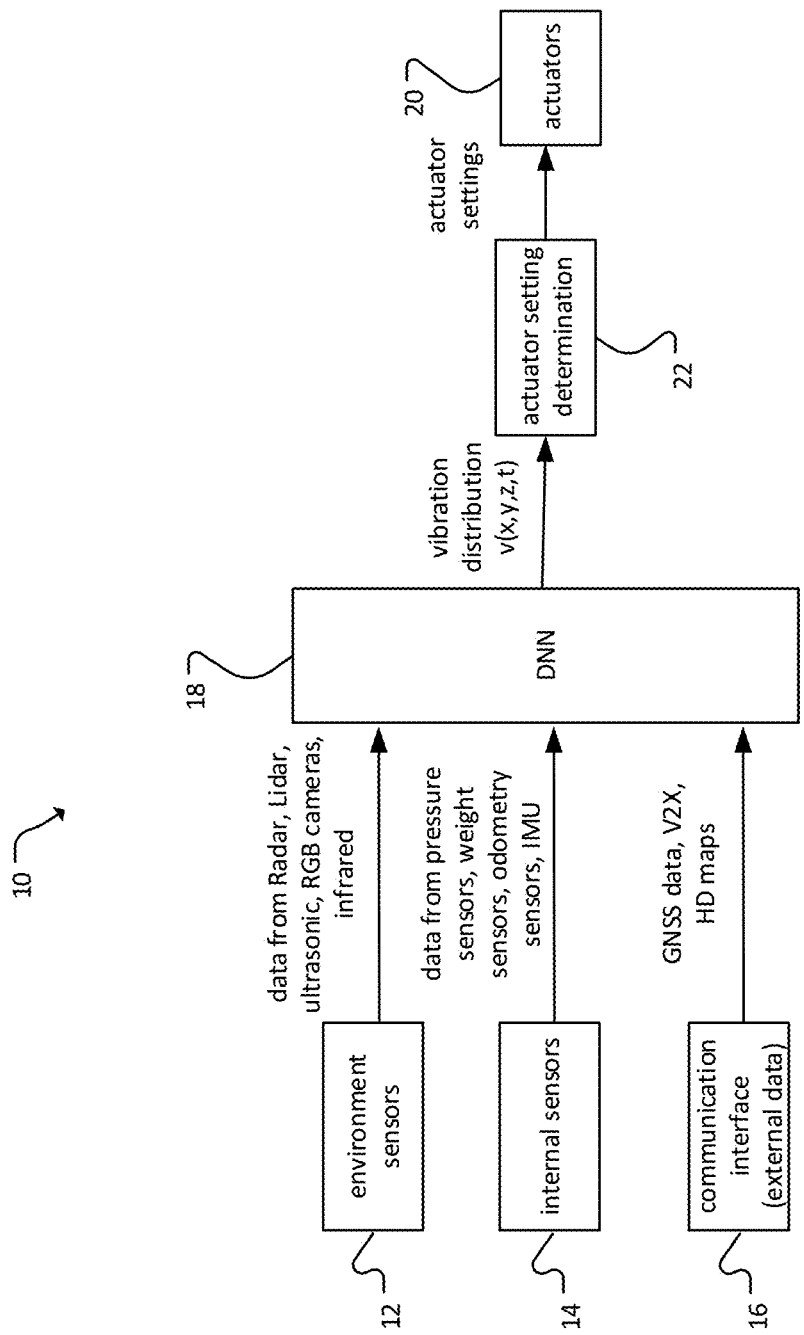
FIG. 7 shows a diagram illustrating a vibration cancellation system according to an alternative embodiment of the present invention where a vibration distribution is determined.

FIG. 7 schematically describes an alternative embodiment in which the DNN 18 is trained to predict a vibration distribution $v(x,y,z,t)$ of time-varying vibrations occurring at predetermined areas of interest (x, y, z) within the vehicle, such as seats, back rests, head rests and the like, when the vehicle is subjected to a predetermined set of conditions. As in the embodiment of FIG. 1, sensor data captured by the environment sensors 12, sensor data captured by the internal sensors 14 and data acquired by the communication interface 16 is provided to a machine learning system 18. The vibration cancellation system according to this embodiment differs from the vibration cancellation system described in FIG. 1 in that it further includes an actuator setting determination unit 22.

DNN 18 of FIG. 7 is trained to convert the sensor data into a predicted vibration distribution $v(x,y,z,t)$ at predetermined areas of interest within the vehicle. The predicted vibration distribution at the predetermined areas of interest is then output to actuator setting determination unit 22 that determines, based on the predicted vibration distribution $v(x,y,z,t)$, actuator settings to be transmitted to the actuators 20 to counteract the vibrations occurring at predetermined areas of interest in the vehicle. The DNN target is to predict vibration distribution $v(x,y,z,t)$ preferably only for areas $(x,y,z)$ of interest, such as passenger seats, foot room, maybe dashboard. It is not needed to eliminate all vibrations within all areas of the car.

The actuators 20 may for example relate to a vibration cancellation device. Most of the vibrations within a car are of low frequency and may be corrected with by such a cancellation device. However, any correction on one location (e.g. on driver seat) will create additional vibration patterns in other regions, thereby creating a chaotic/highly non-linear system. Thus, machine learning operating on the complete vibration distribution within the car, should be able to cope with these effects.

FIG. 8 shows a flow diagram of a process for vibration cancellation using artificial intelligence according to an embodiment where a predicted vibration distribution $v(x,y,z,t)$ is determined.

The example process operates when the vehicle that includes a vibration cancellation system is operational.

At 800, when the vehicle is operational, data from the environment sensors 12, data from the internal sensors 14 and external data received via a communication interface 16 is received. The data of the environment sensors 12 and internal sensors 14 may comprise at least one of: image data, a distance, a temperature, odometry data such as a wheel position, a brake pedal position, an accelerator pedal position, a current direction, a current speed, vehicle motion data (linear acceleration, angular rate), a weight of a seat occupant, a weight distribution and a tire pressure. In addition to the sensory information provided by the environment sensors 12 and internal sensors 14 and the location data, map data may be obtained from a navigation system. Further information, such as weather forecasts for the location and time of travel of the vehicle may me received from service providers via wireless communication. At 810, the data received in 800 are fed into a deep neural network (DNN) 18 trained to determine, based on the input data, a predicted vibration distribution v(x,y,z,t) of vibrations occurring at predetermined areas of interest within the vehicle. That is, collected environment sensor data, operational data, map data and data from service provider are continuously uploaded to the trained deep neural network. At 820, the DNN determines, based on the provided input information, a predicted vibration distribution v(x,y,z,t) of vibrations occurring at predetermined areas of interest within the vehicle and outputs the determined vibration distribution v(x,y,z,t) to the actuator setting determination unit. At 830, DNN 18 outputs the predicted vibration distribution to the actuator setting determination unit. At 840, the actuator setting determination unit 22 determines, based on the predicted vibration distribution v(x,y,z,t), actuator settings to be transmitted to actuators. At 850, the determined actuator settings are transmitted to the actuators to be controlled. The actuators then output, based on the received actuator settings, vibrations, in particular anti-phase vibrations, so as to counteract (reduce or cancel out) the vibrations perceivable at the predetermined areas of interest.

Sensor Fusion

According to another aspect of the embodiments, sensing results as obtained by environment sensors or internal sensors are combined by sensor fusion techniques.

Figure 9:
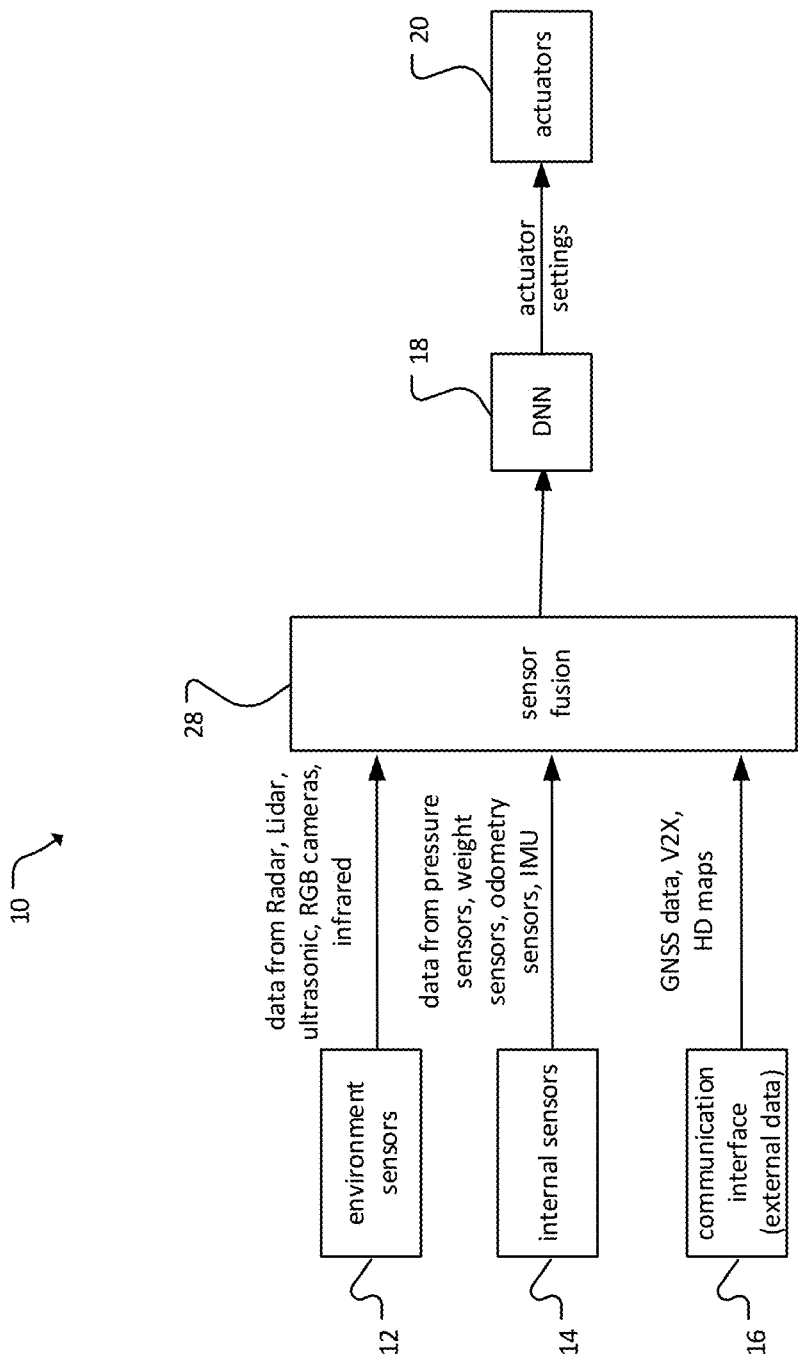
FIG. 9 shows a diagram illustrating a vibration cancellation system according to an alternative embodiment of the present invention where sensor fusion is performed.

FIG. 9 shows a diagram illustrating a vibration cancellation system according to an alternative embodiment of the present invention where sensor fusion is performed. According to the embodiment of FIG. 9, sensor fusion techniques 28 are performed on the outputs of environment sensors 12 and internal sensors 14, such as LiDAR, RADAR, cameras, ultrasonic sensor, microphones, IMUs, odometry, and data received via communication interface 16. The fused sensor data is then fed into a trained neural network 18. In the embodiment illustrated in FIG. 9, the DNN 18 has been trained beforehand to determine, based on the fused sensor data, appropriate actuator settings to be output to each of the actuators 20, distributed at various areas of interest.

Sensor fusion 28 can be performed fusing raw data obtained from different sources, such as GPS sensors, inertial sensors, image sensors, lidar, ultrasonic sensors, microphones and so on. Further, sensor fusion can be used to combine different types of sensing data, such as absolute measurement data (e.g., data provided relative to a global coordinate system such as GPS data) and relative measurement data (e.g., data provided relative to a local coordinate system such as image data, LiDAR data, or ultrasonic sensing data). Sensor fusion can be used to compensate for limitations or inaccuracies associated with individual sensor types, thereby improving the accuracy and reliability of the final sensing result. Mostly, sensor fusion is used to limit the complexity of the DNN by reducing the number of input parameters.

Various techniques can be used to perform sensor fusion, such as Kalman filtering (e.g., Kalman filter, extended Kalman filter, unscented Kalman filter), particle filtering, or other filtering techniques known to those of skill in the art. The method may be selected depending on the specific combination and types of sensors used. The sensor fusion may utilize sensing data from all of the sensors or from only a subset of the sensors. The latter approach may be advantageous in order to omit inadequate or unreliable sensor data.

The fused sensor data may then be fed into a trained neural network that determines, based on these data, a plurality of data to control vibrations occurring in the vehicle.

In the embodiment of FIG. 9, all sensor data is fused. However, the sensor fusion 28 may not necessarily fuse all data. According to alternative examples, only a subset of the sensor data is fused. The sensor fusion may also happen in subsequent blocks, and each fusion itself may include a DNN. In addition, there may be provided compression units, eliminating all unnecessary data (such as blue sky from video or RADAR data outside the area, where the car may drive).

FIG. 9 illustrates a vibration cancellation system according to an embodiment (see FIG. 1 and corresponding description) where a set of actuator settings is determined based on fused sensor data. However, sensor fusion techniques may however as well be applied in the other embodiments. For example, the fused sensor data may also be provided to a DNN 18 trained to predict a distribution v(x,y,z,t) of vibrations occurring at predetermined areas of interest within the vehicle, such as seats, back rests, head rests and the like, as described with regard to FIG. 7 above.

Vibration Warning

When a vibration cancellation system such as described in the embodiments above is installed within a car it might happen that the driver does not recognize critical situations such as situations when the road suffers from severe conditions, or situations when the tires/absorbers suffer physical effects. Also, problems intrinsic to the car might not be recognized when the cancellation removes such effects. Thus, other forms to signal these conditions can be used, such as alarm sounds, or signals/visuals in the dashboard. For example, warning may be issued, when predicted (resulting) vibrations are too large or when the predicted vibration distribution cannot be mitigated (down to an acceptable threshold) by the actuators.

Implementation

The technology according to an embodiment of the present disclosure is applicable to various products. For example, the technology according to an embodiment of the present disclosure may be implemented as a device included in a mobile body that is any of kinds of automobiles, electric vehicles, hybrid electric vehicles, construction machinery, agricultural machinery (tractors), and the like.

Figure 10:
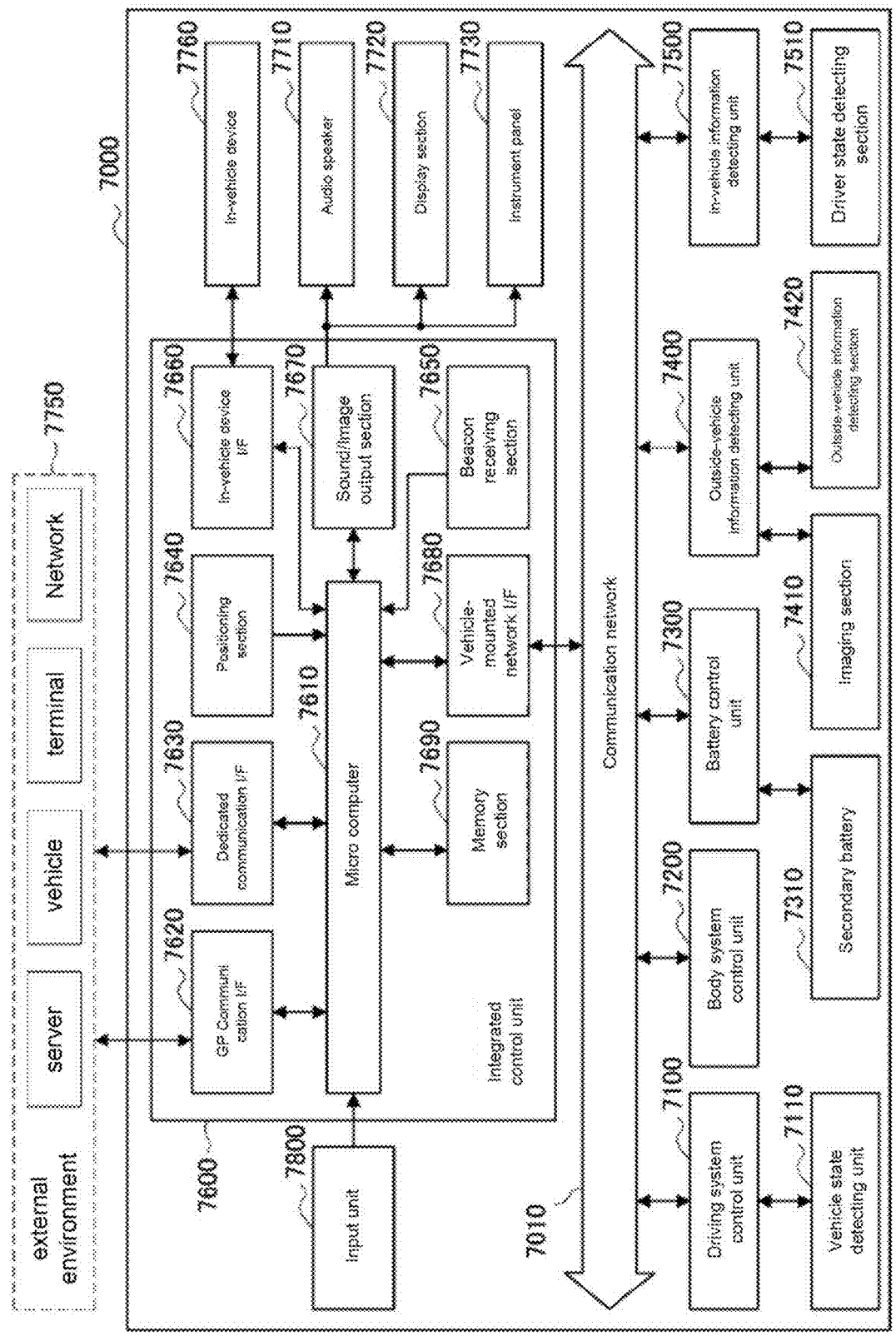
FIG. 10 is a block diagram depicting an example of schematic configuration of a vehicle control system.

FIG. 10 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 10, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 10 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environment sensor for detecting current atmospheric conditions or weather conditions and a peripheral information detecting sensor for detecting another vehicle, an obstacle, a pedestrian, or the like on the periphery of the vehicle including the vehicle control system 7000.

The environment sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a RADAR device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 11 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 11 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a RADAR device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 10, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a RADAR device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote-control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of the vibration cancellation system according to the present invention. The microcomputer 7610 may also perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The sound/image output section 7670 transmits an output signal of at least one of a sound and an image to an output device capable of visually or auditorily notifying information to an occupant of the vehicle or the outside of the vehicle. In the example of FIG. 10, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 10 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Incidentally, a computer program for realizing the functions of the vibration cancellation system according to the present invention can be implemented in one of the control units or the like. In addition, a computer readable recording medium storing such a computer program can also be provided. The recording medium is, for example, a magnetic disk, an optical disk, a magneto-optical disk, a flash memory, or the like. In addition, the above-described computer program may be distributed via a network, for example, without the recording medium being used.

In the vehicle control system 7000 described above, the vibration cancellation system according to the present invention can be applied to the integrated control unit 7600 in the application example depicted in FIG. 10. For example, the DNN (18 in FIG. 1) and the communication interface (16 in FIG. 1) of the vibration cancellation system respectively correspond to the microcomputer 7610, the general-purpose communication I/F 7620 and the dedicated communication I/F 7630 of the integrated control unit 7600.

In addition, at least part of the constituent elements of the vibration cancellation system described with reference to FIG. 1 may be implemented in a module (for example, an integrated circuit module formed with a single die) for the integrated control unit 7600 depicted in FIG. 10. Alternatively, the vibration cancellation system described with reference to FIG. 1 may be implemented by a plurality of control units of the vehicle control system 7000 depicted in FIG. 10.

REFERENCE SIGNS

10 vibration cancellation system
12 environment sensors
14 internal sensors
16 communication interface
18 trained machine learning system
20 actuators
22 actuator setting determination unit
24 vibration sensors
28 sensor fusion

The invention claimed is:

1. An electronic system for controlling vibrations and/or inertial forces occurring at a plurality of areas of interest within an operating vehicle, the electronic system comprising:
   circuitry configured to:
      receive input data comprising sensor data from one or more environment sensors and/or one or more internal sensors;
      convert, using a machine learning system, the input data into actuator settings;
      transmit the actuator settings to one or more actuators to control the vibrations and/or inertial forces occurring at each of the plurality of areas of interest within the operating vehicle; and
      determine a residual vibration distribution based upon received data.

2. The electronic system of claim 1, wherein the input data further comprises external data received via a communication interface.

3. The electronic system of claim 1, wherein the circuitry is configured to convert, using the machine learning system, the input data directly into the actuator settings.

4. The electronic system of claim 1, wherein the circuitry is configured to convert, by means of the machine learning system, the input data into a vibration distribution of vibrations occurring at each of the plurality of areas of interest within the operating vehicle.

5. The electronic system of claim 1, wherein the circuitry is further configured to determine the actuator settings based on a vibration distribution.

6. The electronic system of claim 1, wherein the plurality of areas of interest are located at least at one of: a seat, a backrest, a headrest, a footrest, or a dashboard of the operating vehicle.

7. The electronic system of claim 1, wherein the sensor data includes road condition data of a road in front of the vehicle obtained by one or more of:
   an RGB camera, an infrared camera, a RADAR sensor, a LIDAR sensor, an ultrasonic sensor, and a microphone.

8. The electronic system of claim 7, wherein the road condition data includes an impulse response of a strip of the road.

9. The electronic system of claim 8, wherein the impulse response is an average of a plurality of impulse responses obtained from other vehicles by vehicle-to-infrastructure communication or vehicle-to-vehicle communication.

10. The electronic system of claim 2, wherein the external data comprises map data.

11. The electronic system of claim 1, wherein the sensor data comprises odometry data and/or a weight distribution within the vehicle.

12. The electronic system of claim 1, wherein the circuitry is further configured to perform sensor fusion on the sensor data.

13. The electronic system of claim 1, wherein the machine learning system is a Deep Neural Network (DNN).

14. The electronic system of claim 1, wherein the machine learning system is trained by reinforcement learning.

15. The electronic system of claim 1, wherein the circuitry is further configured to receive the received data from vibration sensors.

16. The electronic system of claim 1, wherein the one or more actuators comprises one or more piezoelectric element.

17. The electronic system of claim 1, wherein the one or more actuators moves a seat, a part of the operating vehicle that is larger than the seat, or a chassis of the operating vehicle.

18. The electronic system of claim 1, wherein the one or more actuators adjusts a stiffness of a material of equipment of the operating vehicle.

19. The electronic system of claim 1, wherein the actuator settings control the one or more actuator by applying an inverse-in-phase time-varying signal so as to reduce vibrations.

20. A computer-implemented method for controlling vibrations and/or inertial forces occurring at a plurality of areas of interest within an operating vehicle, the method comprising:
   receiving input data comprising sensor data from one or more environment sensors and/or one or more internal sensors;
   converting, by means of a machine learning system, the input data into actuator settings;
   transmitting the actuator settings to one or more actuators to control the vibrations and/or inertial forces occurring at each of the plurality of areas of interest within the operating vehicle; and
   determining a residual vibration distribution based upon received data.

* * * * *